United States Patent
Pokharna et al.

(10) Patent No.: US 6,845,008 B2
(45) Date of Patent: Jan. 18, 2005

(54) DOCKING STATION TO COOL A NOTEBOOK COMPUTER

(75) Inventors: Himanshu Pokharna, San Jose, CA (US); Eric Distefano, Livermore, CA (US); Joseph D. Walters, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 09/823,881

(22) Filed: Mar. 30, 2001

(65) Prior Publication Data

US 2002/0141152 A1 Oct. 3, 2002

(51) Int. Cl.[7] ................................................. H05K 7/20
(52) U.S. Cl. ...................... 361/690; 361/695; 174/16.1; 174/16.3; 165/80.1; 165/104.33
(58) Field of Search ................................. 361/687–699, 361/700, 703, 707; 165/104.33, 122, 80.3, 80.4; 174/15.1, 15.2, 16.1, 16.3; 454/184; 312/223.2

(56) References Cited

U.S. PATENT DOCUMENTS

| 5,021,679 | A | | 6/1991 | Fairbanks et al. |
|---|---|---|---|---|
| 5,153,535 | A | | 10/1992 | Fairbanks et al. |
| 5,307,003 | A | | 4/1994 | Fairbanks et al. |
| 5,627,412 | A | | 5/1997 | Beard |
| 5,752,011 | A | | 5/1998 | Thomas et al. |
| 5,959,836 | A | * | 9/1999 | Bhatia ........................ 361/687 |
| 5,974,557 | A | | 10/1999 | Thomas et al. |
| 6,038,128 | A | * | 3/2000 | Hood et al. ................. 361/687 |
| 6,094,347 | A | * | 7/2000 | Bhatia ........................ 361/695 |
| 6,109,039 | A | * | 8/2000 | Hougham et al. ............ 62/3.7 |
| 6,191,943 | B1 | * | 2/2001 | Tracy ......................... 361/687 |
| 6,213,866 | B1 | * | 4/2001 | Impellizzeri ................ 454/184 |
| 6,216,235 | B1 | | 4/2001 | Thomas et al. |
| 6,239,971 | B1 | * | 5/2001 | Yu et al. ..................... 361/695 |
| 6,259,601 | B1 | * | 7/2001 | Jaggers et al. .............. 361/690 |
| 6,275,945 | B1 | * | 8/2001 | Tsuji et al. ................. 713/300 |
| 6,362,959 | B2 | * | 3/2002 | Tracy ......................... 361/687 |
| 6,487,668 | B2 | | 11/2002 | Thomas et al. |

* cited by examiner

*Primary Examiner*—Boris Chervinsky
(74) *Attorney, Agent, or Firm*—Blakely, Sokoloff, Taylor & Zafman LLP

(57) ABSTRACT

A docking station is provided with apertures that line up with apertures in a notebook. When the notebook is docked on the docking station, air is forced out of the notebook through the openings of the docking station and the notebook.

7 Claims, 4 Drawing Sheets

DOCKING STATION TO COOL A NOTEBOOK COMPUTER

BACKGROUND OF THE INVENTION

Intel® SpeedStep™ Technology makes it possible for the pocessor in a docked notebook to run at a higher frequency than when in undocked battery mode. A faster processor generates more heat and typically requires more cooling. Current practice is to design internal notebook cooling based on maximum performance heat dissipation requirements. However, market studies indicate notebooks are infrequently used in the high performance mode. As a result, the entire cooling solution—fans, heat sinks, etc.—are typically larger, heavier, and more expensive than warranted by typical usage models.

Based on the current design paradigm, the continued escalation of system performance and power—aimed at high performance usage scenarios—will require larger onboard cooling solutions occupying a higher percentage of a finite notebook volume.

Therefore, there is a need to relieve notebooks of at least part of the cooling solutions, or to provide additional cooling capacity when a notebook is docked. A prior art notebook and docking station is illustrated in FIG. 1, which provides limited cooling solutions.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for providing a notebook computer and docking station configuration wherein the docking station reduces the temperature of the internal chambers of the notebook computer, is disclosed. In the following description, for purposes of explanation, specific details are set forth to provide a thorough understanding of the present invention. However, it will be apparent to one skilled in the art that these specific details are not required in order to practice the present invention.

Figure 1:
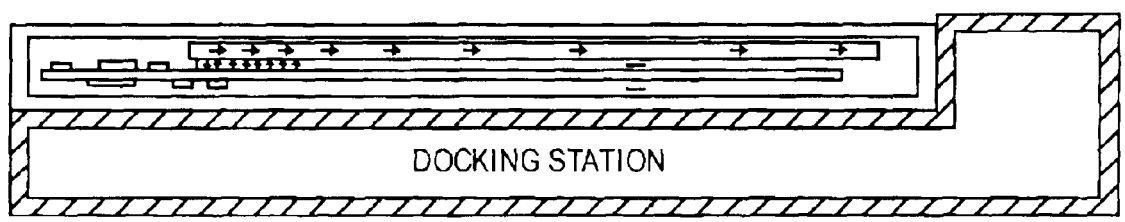
FIG. 1 illustrates a prior art docking station and notebook computer.
Figure 2:
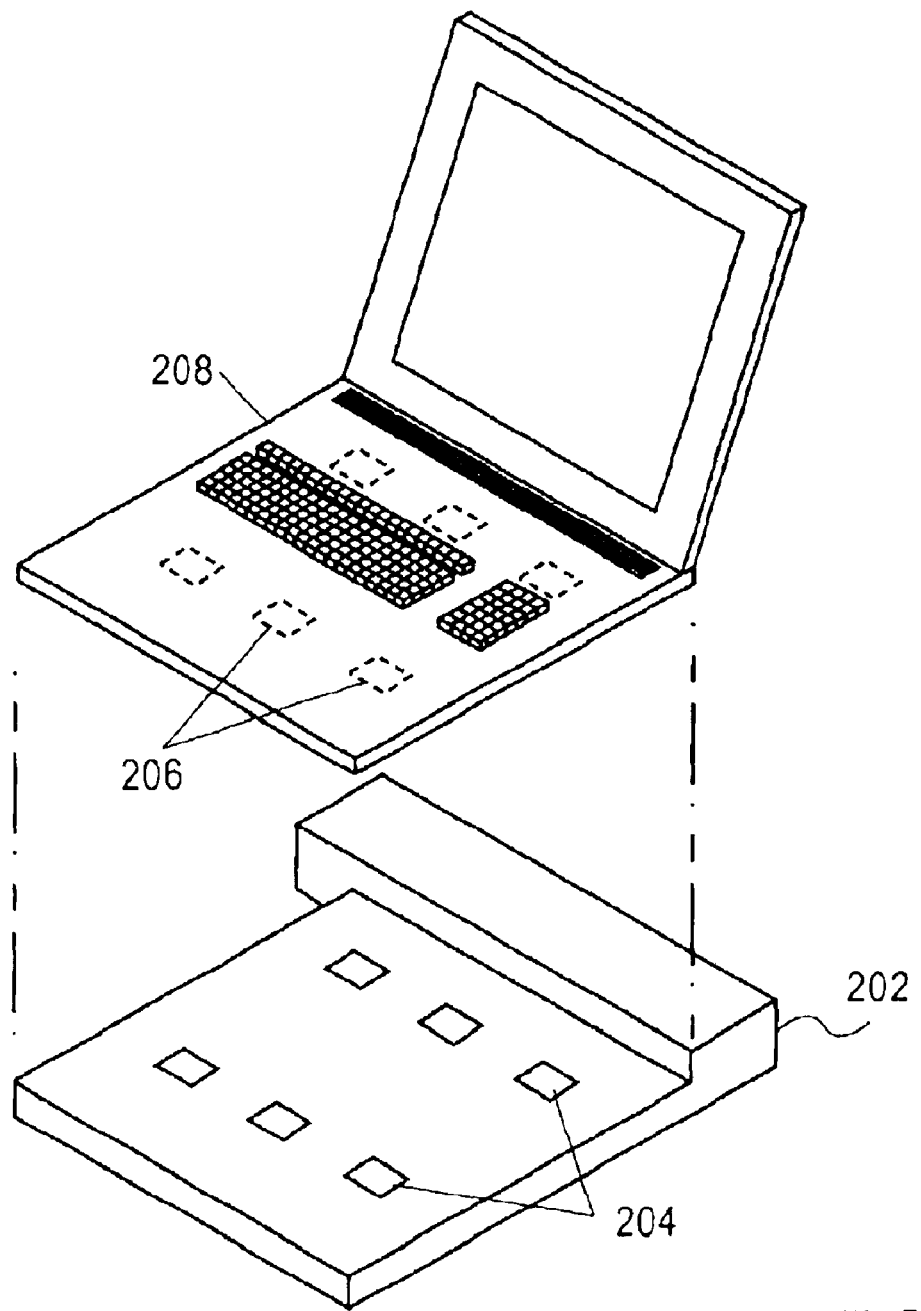
FIG. 2 illustrates an isometric view of the docking station and notebook computer according to one embodiment.

In one embodiment, as illustrated in FIG. 2, a docking station 202 is provided with openings/apertures 204 that line up with openings/apertures 206 in the notebook 208. When the notebook 208 is docked on the docking station 202, cooler air is forced into the notebook 208 through the openings 206 of the docking station 202 and the notebook.

As further illustrated in FIG. 2, the apertures of the notebook computer are located on the bottom of the notebook computer to align with apertures on the surface of the docking station. In alternative embodiment, the apertures of the notebook computer and docking station may be provided in different and/or separate locations.

For example, the apertures may be provided on the sides of the notebook computer to align with apertures provided on the internal sides of the docking station. Furthermore, the number of apertures provided and the size of the apertures may vary without departing from the scope of the invention.

In one embodiment, the apertures on the notebook include sliding doors that remain closed when the notebook is undocked and are slid open when the notebook computer is docked. As a result, foreign objects are restricted from invading the internal chamber of then notebook computer when the notebook computer is undocked.

For example, in one embodiment, the doors to the apertures of the notebook are spring biased to have the doors remain closed when the notebook computer is undocked. The docking station is provided with protruding integral knobs that stand out to catch a latch on the door to the apertures of the notebook computer and push the door to the aperture open as the notebook computer is slid into the docking station. When the notebook computer is removed, the spring-biased doors will close.

The example described above is one example of providing doors to the apertures of the notebook computers. A similar configuration for providing sliding doors on the notebook may also be provided. Moreover, alternative configurations for opening and closing doors to the apertures of the notebook computer could be implemented without departing from the scope of the invention.

Figure 3:
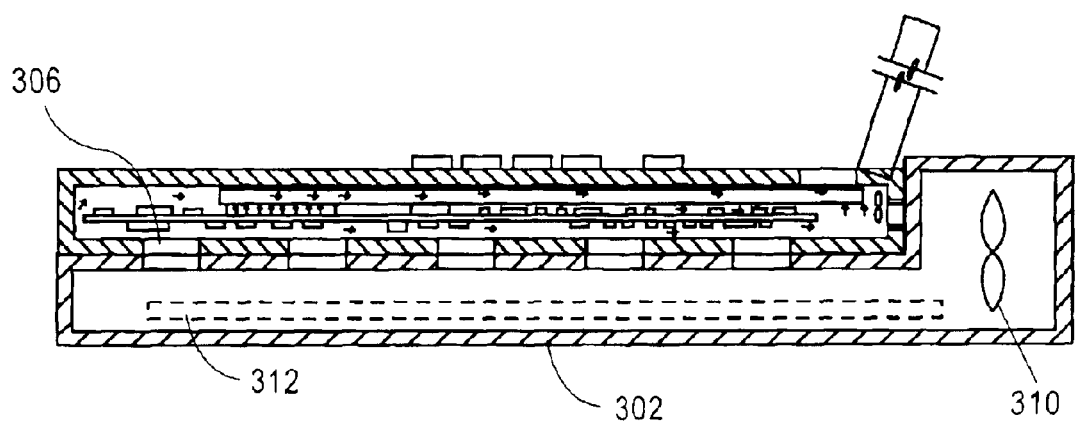
FIG. 3 illustrates a cut-a-way side view of the docking station and notebook computer according to one embodiment.

As illustrated in FIG. 3, the docking station 302 includes a unit 310 (e.g., a fan) to force air into the notebook computer via the apertures of the docking station and notebook computer. In one embodiment, the unit 310 in the docking station to force air into the notebook computer positively pressurizes the internal chamber of the notebook computer by forcing air into the notebook computer with an air pressure higher than air is released by the notebook computer.

The notebook computer includes vents 314 that decrease the release of air from the internal chamber of the computer notebook to assist in creating positively pressurizing the internal chamber of the notebook computer. In alternative embodiments, other types of units to force air into the notebook computer (and positively pressurize the internal chamber of the notebook) may be used without departing from the scope of the invention.

In one embodiment, also illustrated in FIG. 3, the docking station may also include a unit 312 (e.g., a refrigeration unit) to generate sub-ambient temperature air to be forced into the notebook computer (wherein the air forced into the notebook computer is of a lower temperature than the ambient air within the internal chamber of the notebook computer).

In one embodiment, when the notebook computer is docked into the docking station, a thermometer from the docking station (not shown) may extend up into the internal chamber of the notebook computer via the aligned apertures. The thermometer from the docking station may measure the ambient temperature within the notebook computer to have the unit 312 within the docking station generate sub-ambient temperature air adjust accordingly (e.g., if the ambient air within the notebook computer is warmer, cooler air would be generated).

In alternative embodiments, alternative techniques for determining the ambient air temperature within the notebook computer and adjusting the temperature of the air forced into the notebook computer may be implanted without departing from the scope of the invention.

Figure 4A:
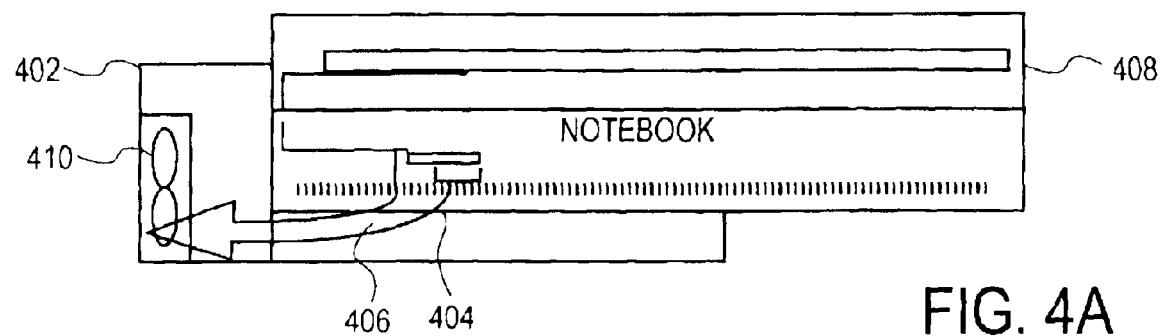
FIGS. 4a–c illustrate one embodiment of a docking station having a convection unit according to one embodiment.
Figure 4B:
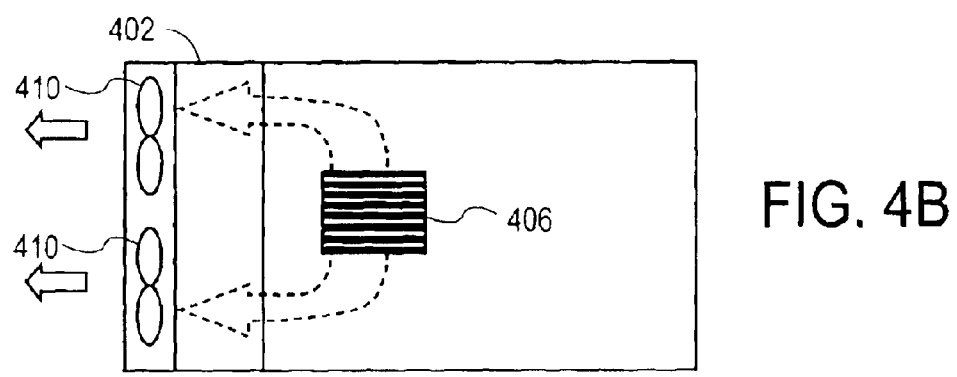
Figure 4C:
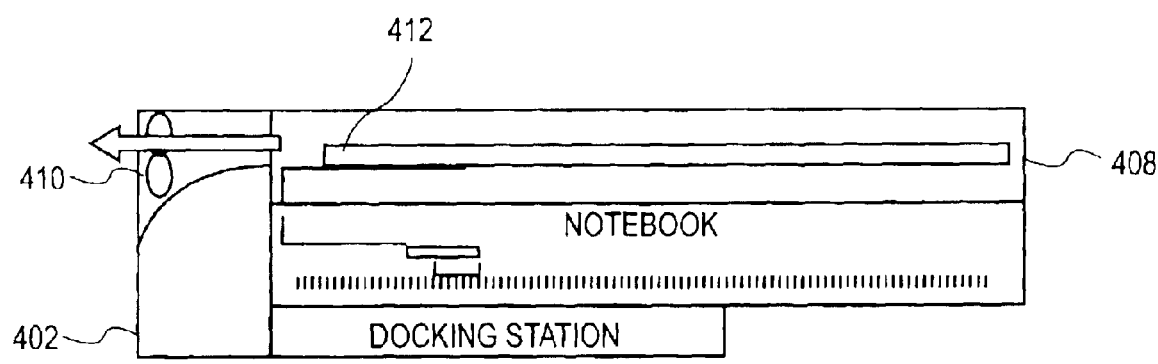

In one embodiment, illustrated in FIGS. 4a–c, the docking station may use a convective cooling technique to remove heat from the notebook. In particular, as shown in FIG. 4a, the notebook includes a vent/aperture 404 aligned with an opening/aperture 406 in the docking station 402. The docking station 402 includes a convective unit 410 (e.g., a fan) that pulls/exhales warm air from the notebook through the vent 404 into the docking station and expels the warm air out of the docking station. Alternatively, the docking station includes a convective unit 410 that pushes warm air from the notebook through the vent 404 into the docking station and expels the warm air out of the docking station.

In one embodiment as illustrated in top view of FIG. 4b, the docking station may include multiple fans and more than one opening aligned with more than one vent of the notebook. In addition, the openings of the docking station, in one embodiment, can be aligned with vents on the bottom of a notebook, as shown in FIG. 4a, to remove heat generated in closer proximity to the heat generating source (e.g., the processor.)

In one embodiment, the docking station can have an aperture aligned with an aperture of the computer system exposing an area relative to a thermal spreader (e.g., water loop, loop heat pipe, or hinged heat pipe). As a result, the convection unit of the docking station can force air onto the thermal spreader, or alternative pull warm air from the thermal spreader, thereby performing the operations of remote heat exchanger, without adding to the volume of the computer system.

An example is illustrated in FIG. 4c, the openings of the docking station are aligned with vents on the back of the display of a notebook, to remove heat from a thermal spreader 412 included in the notebook, thereby providing a remote heat exchange.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A docking station comprising:
   a set of apertures on a top surface of the docking station to align with a set of apertures on a bottom surface of a computer system, exclusive of a duct extending into the apertures of the computer system; and
   a convection unit to forces air into the computer system when the computer system is docked, wherein the docking station includes a cooling unit to generate air to be forced into the computer system that is of a lower temperature compared to an ambient air temperature within said computer system.

2. The docking station of claim 1, wherein the convection unit is to exhale air from the computer system when the computer system is docked.

3. A computer system comprising:
   a first set of apertures on a bottom surface of the computer system to align with a second set of apertures on a top surface of a docking station, the first set of apertures providing an air passage way for air movement generated by a convection unit in the docking station without having a duct extending between the apertures, wherein the air forced into the computer system from the docking station is at a temperature lower than an ambient temperature within the computer system, the docking station having a cooling unit.

4. The computer system of claim 3, wherein the first aperture of the computer system releases air movement in response to the convection unit in the docking station exhaling air from within the computer system.

5. A method of cooling a computer system comprising:
   receiving a docking of a computer system;
   aligning a set of apertures on a top surface a docking station with a set of apertures on a bottom surface the computer system, the set of apertures providing an air passage way for air movement between the docking station and computer system, exclusive of a duct extending between the apertatures of the docking stationg and the computer system;
   a convective unit in the docking station removing internal ambient air from the computer system when the computer system is docked; and
   providing air to the computer from the docking station at a temperature lower than an ambient temperature within the computer system, the temperature of the air provided to the computer is reduced by a cooling unit within the docking station.

6. The method of claim 5, further including:
   the docking station removing internal ambient air from the computer system when the computer system is docked by the docking station forcing air into the computer system.

7. The method of claim 5, further including:
   reducing an internal temperature of the computer system via air movement generated by the convection unit of the docking station.

* * * * *